(12) United States Patent
Segawa et al.

(10) Patent No.: US 8,779,339 B2
(45) Date of Patent: Jul. 15, 2014

(54) MICROWAVE HEATING METHOD AND MICROWAVE HEATING APPARATUS

(75) Inventors: Terutsugu Segawa, Shiga (JP); Seiji Hamano, Hyogo (JP); Fumio Sugata, Ehime (JP)

(73) Assignee: Panasonic Corporation, Osaka (JP)

( * ) Notice: Subject to any disclaimer, the term of this patent is extended or adjusted under 35 U.S.C. 154(b) by 946 days.

(21) Appl. No.: 12/936,787

(22) PCT Filed: Feb. 4, 2010

(86) PCT No.: PCT/JP2010/000660
§ 371 (c)(1),
(2), (4) Date: Oct. 7, 2010

(87) PCT Pub. No.: WO2010/090016
PCT Pub. Date: Aug. 12, 2010

(65) Prior Publication Data
US 2011/0031238 A1 Feb. 10, 2011

(30) Foreign Application Priority Data

Feb. 6, 2009 (JP) ................................ 2009-025452
Mar. 4, 2009 (JP) ................................ 2009-050002

(51) Int. Cl.
*H05B 6/64* (2006.01)
(52) U.S. Cl.
USPC ............................ 219/759; 219/756; 219/757
(58) Field of Classification Search
USPC ......... 219/678, 679, 702, 757, 759, 756, 680, 219/683, 731; 422/21
See application file for complete search history.

(56) References Cited

U.S. PATENT DOCUMENTS

2003/0071037 A1* 4/2003 Sato et al. ..................... 219/731
2003/0111462 A1   6/2003 Sato et al.
2003/0205573 A1* 11/2003 Okumura et al. ............. 219/680

FOREIGN PATENT DOCUMENTS

| JP | 2002-130960 | 5/2002 |
| JP | 2003-075070 | 3/2003 |
| JP | 2003-277157 | 10/2003 |
| JP | 3799454 | 5/2006 |
| JP | 3845777 | 9/2006 |
| JP | 2007-230796 | 9/2007 |

* cited by examiner

*Primary Examiner* — Henry Yuen
*Assistant Examiner* — Hung D Nguyen
(74) *Attorney, Agent, or Firm* — Hamre, Schumann, Mueller & Larson, P.C.

(57) ABSTRACT

A microwave heating apparatus (101) includes a burning chamber (103) in which an object (102) to be burned is placed, a magnetron (116) for applying microwaves into the heating apparatus, a cooling gas introducing mechanism (112*b*) for introducing a cooling gas from outside the heating apparatus into the heating apparatus, a cooling gas channel (113*b*) through which the cooling gas flows to the burning chamber (103), heat-generating members (114*a* to 114*e*) for self-heating with microwaves applied thereto to heat the cooling gas flowing through the cooling gas channel (113*b*) and a control section (117) for, when the burning chamber (103) having the object (102) to be burned placed therein is cooled, causing the cooling gas introducing mechanism (112*b*) to introduce the cooling gas into the heating apparatus, and causing the magnetron (116) to intermittently apply microwaves into the heating apparatus.

7 Claims, 18 Drawing Sheets

F I G. 3
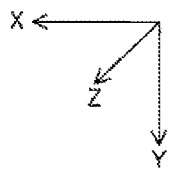
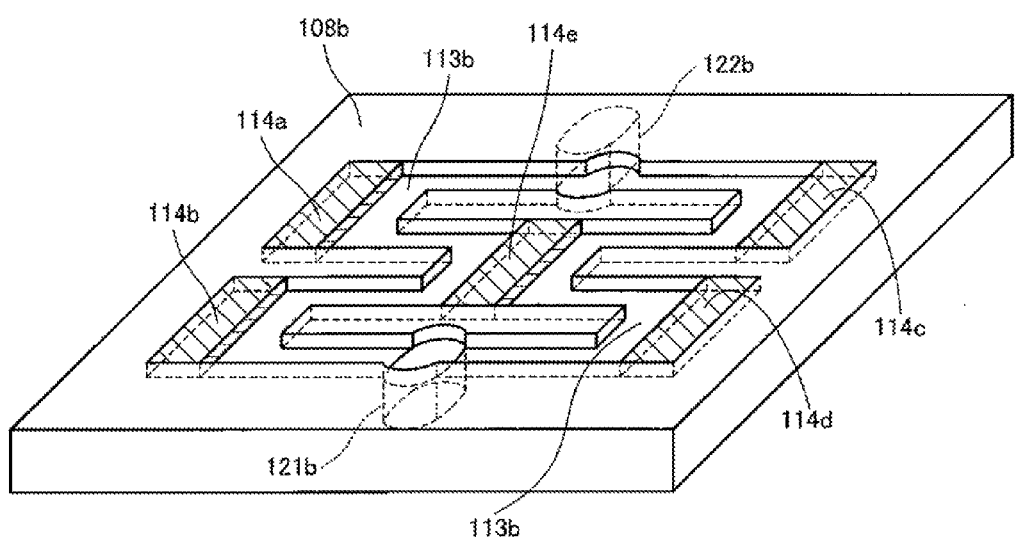

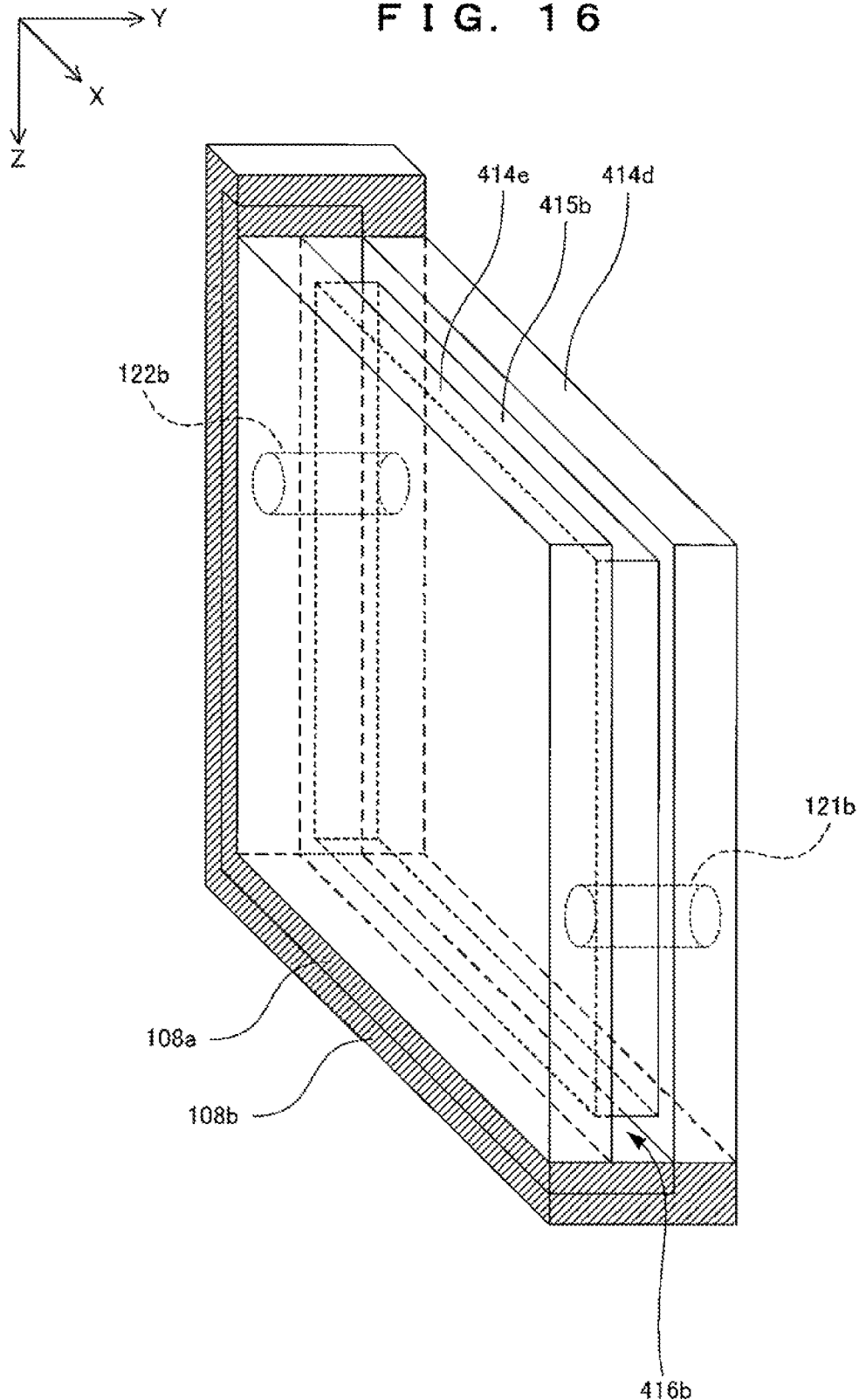
F I G. 16

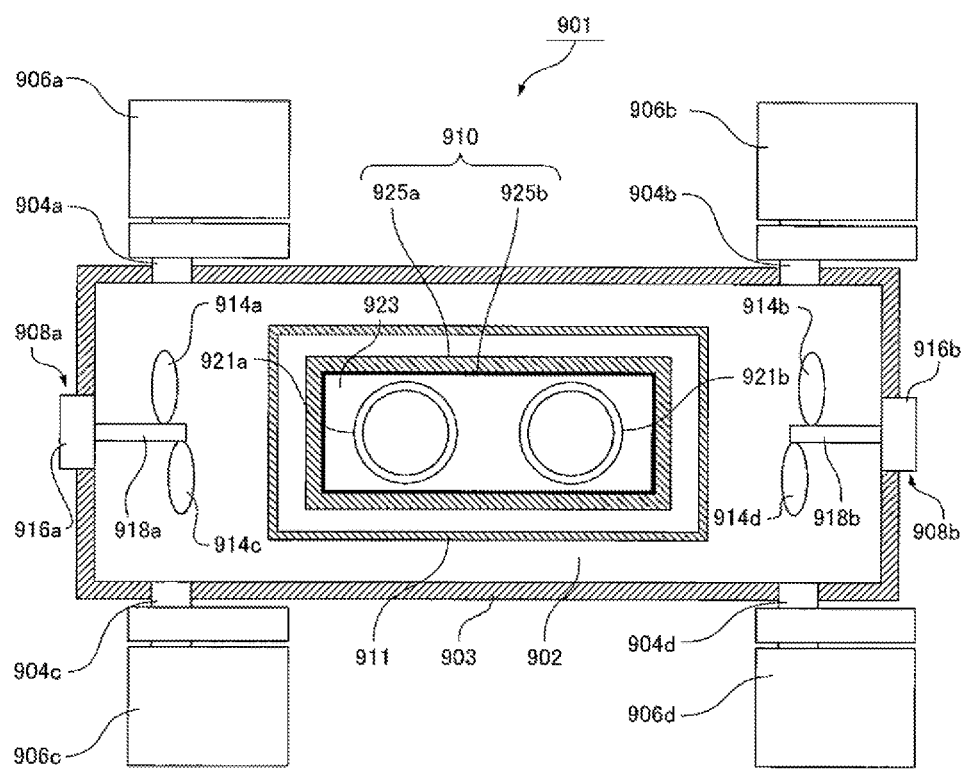
F I G. 1 8    PRIOR ART

MICROWAVE HEATING METHOD AND MICROWAVE HEATING APPARATUS

TECHNICAL FIELD

The present invention relates to a microwave heating method and a microwave heating apparatus for burning, by the application of microwaves, an object to be burned, the object being made of a fine ceramic material or the like.

BACKGROUND ART

Conventionally, microwave heating apparatuses for burning fine ceramics by the application of microwaves have been in practical use. In the microwave heating apparatuses, in principle, portions of an object to be burned, which is made of a fine ceramic material or the like, are uniformly heated by the application of microwaves, when the object to be burned is homogeneous. In the initial stage of the burning process, however, the temperature of the atmosphere in the heating apparatus is significantly lower than the temperature of the surface of the object to be burned. Therefore, heat is radiated from the surface of the object to be burned and thus a temperature gradient between the surface and the central portion of the object to be burned is produced, so that cracks are easily produced.

Further, heating performed by the application of microwaves has such a characteristic that the dielectric loss increases towards a portion at high temperature in the same material. Specifically, the efficiency of absorption of microwaves is higher in a portion at a higher temperature than in a portion at a lower temperature. Therefore, once a temperature gradient is produced, the difference in microwave absorption efficiency is further increased to cause local heating, thereby further increasing the difference in temperature and promoting the generation of cracks.

To solve the above-described problem, a microwave heating apparatus has been proposed in which an isothermal barrier for making a temperature gradient from the inside to the outside of an object to be burned isothermal distribution is formed in the heating apparatus to permit the generation of a temperature gradient in the object to be burned and to reduce the generation of cracks. As this microwave heating apparatus, an apparatus having the construction shown in FIG. 18 has been proposed (see, for example, Patent Document 1).

As shown in FIG. 18, a microwave heating apparatus 901 includes a cavity 903 in which a microwave space 902 is partitioned and formed, magnetrons 906a to 906d which are connected to the cavity 903 via waveguides 904a to 904d and provided as microwave generation units to radiate microwaves into the cavity 903, microwave agitators 908a and 908b for agitating the microwaves radiated into the cavity 903, a blanket 910 provided in the cavity 903, and an auxiliary blanket 911 surrounding the blanket 910.

In the cavity 903, at least the inner surface reflects the microwaves into the microwave space 902 to prevent the microwaves from leaking out of the cavity 903.

The microwave agitator 908a has agitating blades 914a and 914c disposed in the cavity 903, a drive motor 916a disposed outside the cavity 903, and a rotation-transmitting shaft 918a through which a rotation of the drive motor 916a is transmitted to the agitating blades 914a and 914c. The agitating blades 914a and 914c rotate about the rotation-transmitting shaft 918a to agitate the atmosphere in the cavity 903.

The microwave agitator 908b has agitating blades 914b and 914d disposed in the cavity 903, a drive motor 916b disposed outside the cavity 903, and a rotation-transmitting shaft 918b through which a rotation of the drive motor 916b is transmitted to the agitating blades 914b and 914d. The agitating blades 914b and 914d rotate about the rotation-transmitting shaft 918b to agitate the atmosphere in the cavity 903.

The blanket 910 is formed by partitioning a burning chamber 923 in which objects 921a and 921b to be burned are placed. The blanket 910 has a double-wall structure in which an outer casing wall 925a and an inner casing wall 925b are provided as walls for partitioning and forming the burning chamber 923.

The outer casing wall 925a is made of a material having heat insulating properties while permitting the transmission of microwaves. Specifically, the outer casing wall 925a is made of alumina fibers, foamed alumina or the like. The inner casing wall 925b is made of a dielectric material which self-heats with microwaves from the outside and allows a part of the microwaves to pass through the inner casing wall 925b into the burning chamber 923. For example, as a dielectric material suitable for the inner casing wall 925b, a high-temperature-range exothermic material is used which self-heats at least as much as the objects 921a and 921b to be burned within a high temperature range of about the temperature at which the objects 921a and 921b to be burned are burned.

The auxiliary blanket 911 forms a heat insulating space surrounding the blanket 910 to prevent the generation of a temperature gradient due to the radiation of heat from the blanket 910 into the atmosphere surrounding the blanket 910. The auxiliary blanket 911 is made of a heat insulating material such as alumina fibers or foamed alumina having heat insulating properties while permitting the transmission of microwaves.

Thus, the partition wall of the blanket 910 defining the burning chamber 923 is formed of the inner casing wall 925b self-heating with applied microwaves and permitting a part of the microwaves to pass through the inner casing wall 925b into the burning chamber 923, and the outer casing wall 925a which surrounds the inner casing wall 925b and is made of a heat insulating material. In parallel with the progress of microwave heating on the objects 921a and 921b to be burned, the temperature of the atmosphere in the burning chamber 923 is increased by the self-heating of the inner casing wall 925b, while the radiation of heat from the burning chamber 923 to the outside is prevented by the outer casing wall 925a.

Accordingly, the atmosphere in the burning chamber 923 is stably maintained at a high temperature according to an increase in the temperature of the objects 921a and 921b to be burned. Thus, the radiation of heat from the surfaces of the objects 921a and 921b to be burned into the atmosphere surrounding the objects 921a and 921b to be burned is reduced. As a result, a temperature gradient is not easily produced between the surfaces and central portions of the objects 921a and 921b to be burned. In consequence, the generation of cracks due to the generation of a temperature gradient is prevented and burning with improved stability can be achieved.

Further, as a configuration for preventing the generation of a temperature gradient, a configuration having a double-isothermal-barrier structure (see, for example, Patent Document 2) has been proposed.

RELATED ART DOCUMENTS

Patent Document

Patent Document 1: Japanese Patent No. 3845777
Patent Document 2: Japanese Patent No. 3799454

DISCLOSURE OF THE INVENTION

Problems to be Solved by the Invention

An object of the above-described conventional configurations is to provide a heating apparatus capable of reducing thermal strain in an object to be burned even in the case of burning at a relatively high temperature. Uniform heating and a rapid temperature rise by the application of microwaves can be thereby achieved. However, a great deal of time is required to cool the object to be burned and the interior of the heating apparatus because the insulating performance of the heating apparatus is very high.

If a gas at a room temperature is introduced into the heating apparatus at the time of cooling to solve the problem, the object to be burned and the component parts of the heating apparatus are broken by a thermal shock due to a temperature difference from the gas.

Further, it is difficult to heat a gas outside the heating apparatus and provide piping through which the heated gas is introduced into the heating apparatus, because microwaves are influenced thereby. Moreover, in such a case, there is a need for a separate plant and, therefore, the facility cost is increased.

An object of the present invention is to provide, as a solution to the above-described problems of the related art, a microwave heating apparatus and a microwave heating method capable of reducing a time required for cooling in a microwave heating cycle without providing a heating source outside the heating apparatus.

Means for Solving the Problems

To solve the above-described problems, a microwave heating method according to the present invention which (a) burns an object to be burned by using microwaves, the method including (b) introducing a cooling gas from outside a heating apparatus into the heating apparatus and causing the cooling gas to flow into a burning chamber in the heating apparatus when the burning chamber having the object to be burned placed therein is cooled, and (c) intermittently applying microwaves into the heating apparatus to cause a heat-generating member placed in a channel through which the cooling gas flows into the burning chamber to generate heat, whereby the cooling gas flowing through the channel is heated.

To solve the above-described problems, a microwave heating apparatus according to the present invention which (a) burns an object to be burned by using microwaves, the apparatus including (b) a burning chamber in which the object to be burned is placed, (c) a magnetron for applying microwaves into the heating apparatus, (d) an introduction mechanism for introducing a cooling gas from outside the heating apparatus into the heating apparatus, (e) a channel through which the cooling gas flows to the burning chamber, (f) a heat-generating member for self-heating with microwaves applied thereto to heat the cooling gas flowing through the channel, and (g) a control section for, when the burning chamber having the object to be burned placed therein is cooled, causing the introduction mechanism to introduce the cooling gas into the heating apparatus and causing the magnetron to intermittently apply microwaves into the heating apparatus.

Advantages of the Invention

According to the present invention, the object to be burned and the interior of the heating apparatus can be rapidly cooled while avoiding thermal shock breakage due to a rapid change in temperature. As a result, a time required for cooling in a microwave heating cycle can be reduced without providing a heating source outside the heating apparatus.

BRIEF DESCRIPTION OF THE DRAWINGS

FIG. 3 is a perspective view schematically showing a cooling gas channel as viewed from the direction of arrow in a section of the microwave heating apparatus according to the first embodiment cut along line A-A;

FIG. 16 is a perspective view schematically showing a cooling gas channel as viewed from the direction of arrow in a section of the microwave heating apparatus according to the fourth embodiment cut along line C-C;

FIG. 18 is a diagram schematically showing the structure of a conventional microwave heating apparatus.

BEST MODE FOR CARRYING OUT THE INVENTION

First Embodiment

A first embodiment of the present invention will be described with reference to the drawings.
<Microwave Heating Apparatus>

Figure 1:
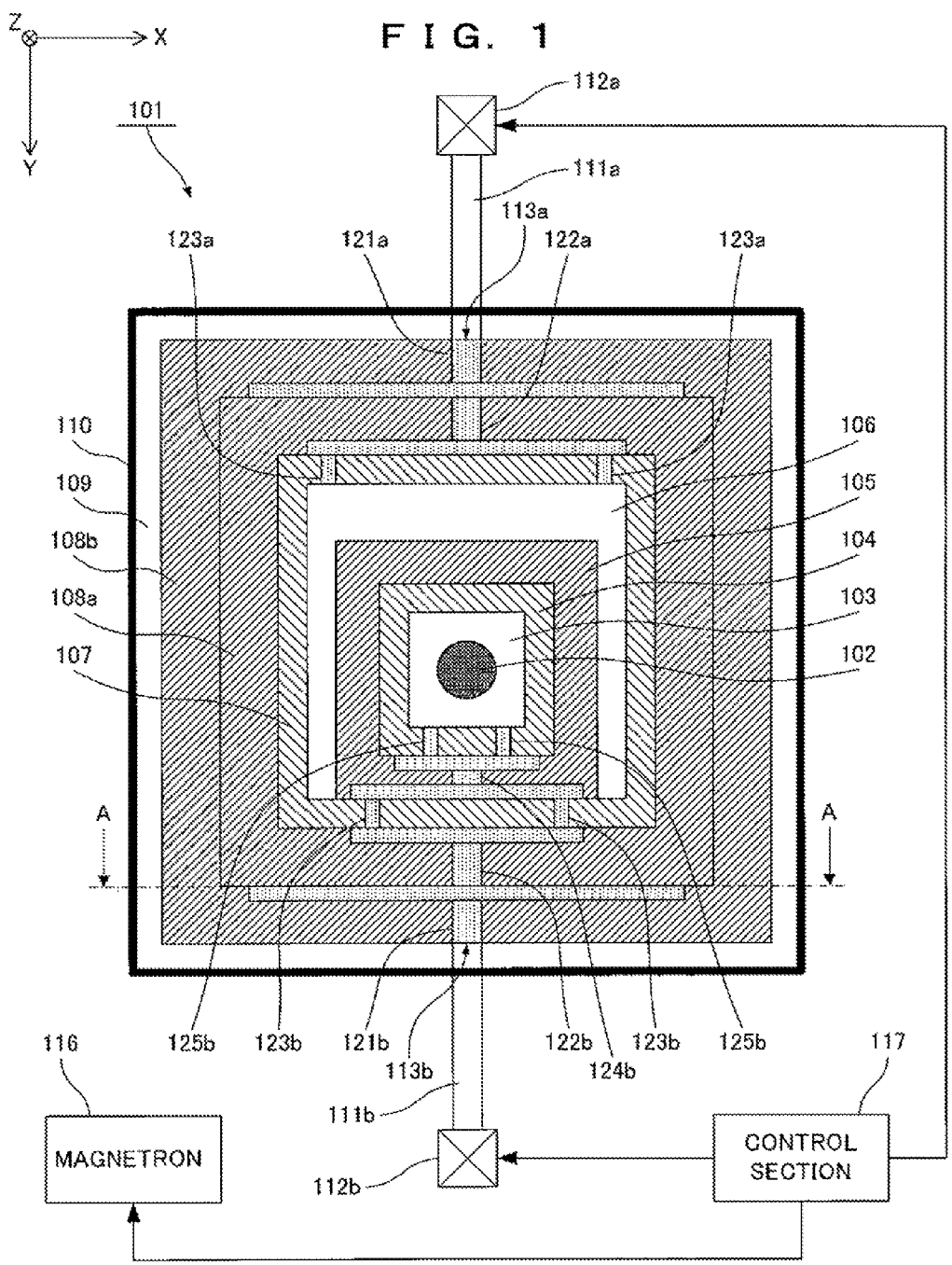
FIG. 1 is a diagram schematically showing the structure of a microwave heating apparatus according to a first embodiment as viewed from a vertical direction.
Figure 2:
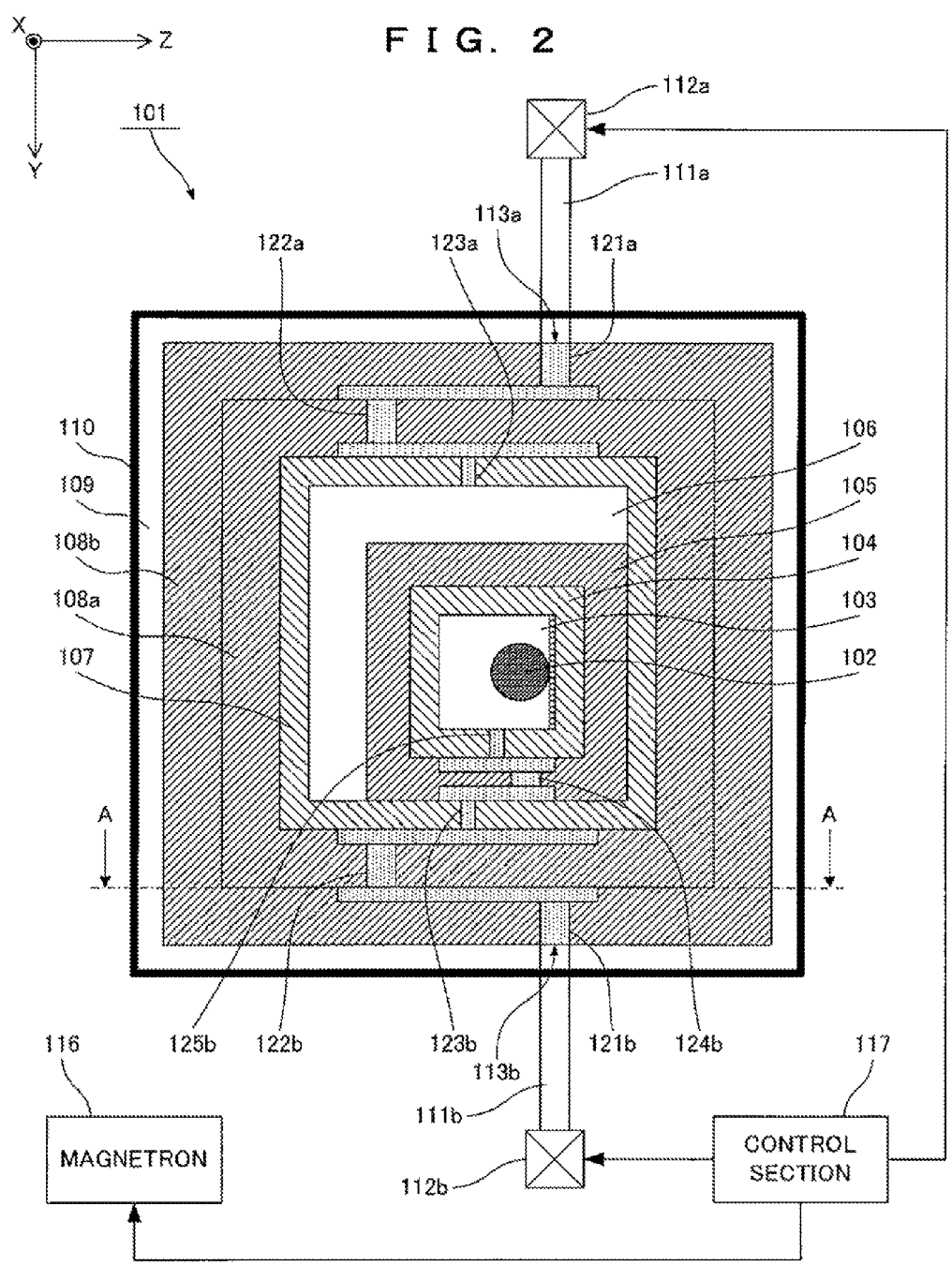
FIG. 2 is a diagram schematically showing the structure of the microwave heating apparatus according to the first embodiment as viewed from a horizontal direction.

In a microwave heating apparatus 101 of the present embodiment, as shown in FIGS. 1 and 2, microwaves generated by a magnetron 116 are introduced into a cavity 110 in an enclosed state through a waveguide (not shown) when microwave-burning of an object 102 to be burned placed in a burning chamber 103 is performed. The microwaves introduced into the cavity 110 are agitated by a microwave agitator (not shown) provided in the microwave heating apparatus 101. Further, the application time and application intensity of microwaves are controlled by a control section 117 provided in the microwave heating apparatus 101. When the burning chamber 103 having the object 102 to be burned placed therein is cooled, the control section 117 controls cooling gas introducing mechanisms 112a and 112b and the magnetron 116 to cause the cooling gas introducing mechanisms 112a and 112b to introduce a cooling gas into the heating apparatus and to cause the magnetron 116 to intermittently apply microwaves into the heating apparatus.

In FIG. 1, the microwave heating apparatus 101 is viewed through from a Z-direction. In FIG. 2, the microwave heating apparatus 101 is viewed through from an X-direction.

Specifically, an outer partition wall 108b is provided in the cavity 110. An outer partition wall 108a is provided inside the outer partition wall 108b. An outer partition wall heat-generating member 107 is provided inside the outer partition wall 108a. The outer partition walls 108a and 108b and the outer partition wall heat-generating member 107 are placed so as to surround an inner partition wall 105. A 50-mm inter-partition space 106 is provided between the inner partition wall 105 and the outer partition wall heat-generating member 107 (except the bottom surface of the inner partition wall 105). An inner partition wall heat-generating member 104 is provided inside the inner partition wall 105. The burning chamber 103 is formed inside the inner partition wall heat-generating member 104.

The object 102 to be burned is placed directly in the burning chamber 103, on a table (not shown) or the like in the burning chamber 103. There is a possibility that the object 102 to be burned is caught by the burning chamber 103 or the table to be deformed when the object 102 to be burned shrinks during burning. In order to avoid this, it is preferable to spread spherical objects below the object 102 to be burned. For example, alumina balls or the like are spread below the object 102 to be burned in order that no load is imposed on the object 102 to be burned when the object 102 to be burned shrinks. In the present embodiment, spherical alumina balls having a diameter of 0.5 mm are spread.

The inner partition wall heat-generating member 104 is formed of a material which self-heats with microwaves applied thereto. The inner partition wall 105 is formed of a heat-insulating material permitting transmission of microwaves. The outer partition wall heat-generating member 107 is formed of a material which self-heats with microwaves applied thereto, as is the inner partition wall heat-generating member 104. The outer partition walls 108a and 108b are formed of a heat-insulating material permitting transmission of microwaves, as is the inner partition wall 105. For example, the inner partition wall heat-generating member 104 is formed of an inorganic material such as (a) a mullite-based material, (b) a silicon nitride-based material, (c) alumina, (d) a metal oxide of high microwave absorptivity (e.g., magnesia, zirconia, and iron oxide), and (e) a silicon carbide. The inner partition wall 105 is formed of alumina fibers, foamed alumina or the like. The inner partition wall 105 and the outer partition walls 108a and 108b may be formed of the same material or different materials. Further, the inner partition wall heat-generating member 104 and the outer partition wall heat-generating member 107 may be formed of the same material or different materials. However, if materials extremely different in thermal characteristics or the like are used, the temperature control in the microwave heating apparatus 101 becomes complicated. It is therefore desirable to use the same material for these members.

The inner partition wall heat-generating member 104 is placed over the inner surface of the inner partition wall 105. The outer partition wall heat-generating member 107 is placed over the inner surface of the outer partition wall 108a. The inner partition wall heat-generating member 104 and the outer partition wall heat-generating member 107 may be placed not over the inner surface but partially on the inner surface, as long as the desired thermal characteristics can be achieved. For example, a plurality of disk-like or octagonal heat-generating members may be disposed on the inner surface of the inner partition wall 105 or the outer partition wall 108a.

The cavity 110 is formed of a metal such as stainless steel. Further, the cavity 110 is formed so that its inner surface reflects microwaves. It is preferable to plate the inner surface of the cavity 110 with copper, because the reflection efficiency is improved.

The cooling gas introducing mechanism 112a introduces a cooling gas from outside the heating apparatus into the heating apparatus. A cooling gas is introduced from the cooling gas introducing mechanism 112a into the inter-partition space 106 through a cooling gas introducing pipe 111a and a cooling gas channel 113a.

The cooling gas introducing mechanism 112b introduces a cooling gas from outside the heating apparatus into the heating apparatus. A cooling gas is introduced from the cooling gas introducing mechanism 112b into the burning chamber 103 through a cooling gas introducing pipe 111b and a cooling gas channel 113b.

If the cooling gas is air, fans or pumps are used as the cooling gas introducing mechanisms 112a and 112b. If the cooling gas is a compressed gas such as nitrogen, valves for controlling the flow rate are used as the cooling gas introducing mechanisms 112a and 112b. Filters (not shown) for collecting dust or particles in the cooling gas to be introduced into the burning chamber 103 may be provided in the cooling gas introducing pipes 111a and 111b. In this way, the cooling gas can be introduced into the inter-partition space 106 and the burning chamber 103 stably.

The cooling gas channel 113a is a channel through which a cooling gas supplied from the cooling gas introducing mechanism 112a via the cooling gas introducing pipe 111a flows into the inter-partition space 106. The cooling gas channel 113a includes interlayer cooling gas channels 121a to 123a. The interlayer cooling gas channel 121a is formed in the outer partition wall 108b on the cooling gas introducing mechanism 112a side so that a cooling gas flows in a Y-direction. The interlayer cooling gas channel 122a is formed in the outer partition wall 108a on the cooling gas introducing mechanism 112a side so that the cooling gas flows in the Y-direction. The interlayer cooling gas channel 123a is formed in the outer partition wall heat-generating member 107 on the cooling gas introducing mechanism 112a side so that the cooling gas flows in the Y-direction. However, the interlayer cooling gas channels 121a to 123a are placed so that the cooling gas does not flow straight in the Y-direction.

The interlayer cooling gas channel 121a extends in the Y-direction through the outer partition wall 108b on the cooling gas introducing mechanism 112a side. One end of the interlayer cooling gas channel 121a is connected to the cooling gas introducing pipe 111a. The other end of the interlayer cooling gas channel 121a is connected to a space formed between the outer partition wall 108b and the outer partition wall 108a on the cooling gas introducing mechanism 112a side.

The interlayer cooling gas channel 122a extends in the Y-direction through the outer partition wall 108a on the cooling gas introducing mechanism 112a side. One end of the interlayer cooling gas channel 122a is connected to the space formed between the outer partition wall 108b and the outer partition wall 108a on the cooling gas introducing mechanism 112a side. The other end of the interlayer cooling gas channel 122a is connected to a space formed between the outer partition wall 108a and the outer partition wall heat-generating member 107 on the cooling gas introducing mechanism 112a side.

The interlayer cooling gas channels 123a extend in the Y-direction through the outer partition wall heat-generating member 107 on the cooling gas introducing mechanism 112a side. One end of each interlayer cooling gas channel 123a is connected to the space formed between the outer partition wall 108a and the outer partition wall heat-generating member 107 on the cooling gas introducing mechanism 112a side. The other end of the interlayer cooling gas channel 123a is connected to the inter-partition space 106.

The cooling gas channel 113b is a channel through which a cooling gas supplied from the cooling gas introducing mechanism 112b via the cooling gas introducing pipe 111b is introduced into the burning chamber 103. The cooling gas channel 113b includes interlayer cooling gas channels 121b to 125b. The interlayer cooling gas channel 121b is formed in the outer partition wall 108b on the cooling gas introducing mechanism 112b side so that the cooling gas flows in the Y-direction. The interlayer cooling gas channel 122b is formed in the outer partition wall 108a on the cooling gas introducing mechanism 112b side so that the cooling gas flows in the Y-direction. The interlayer cooling gas channels 123b are formed in the outer partition wall heat-generating member 107 on the cooling gas introducing mechanism 112b side so that the cooling gas flows in the Y-direction. The interlayer cooling gas channel 124b is formed in the inner partition wall 105 on the cooling gas introducing mechanism 112b side so that the cooling gas flows in the Y-direction. The interlayer cooling gas channel 125b is formed in the inner partition wall heat-generating member 104 on the cooling gas introducing mechanism 112b side so that the cooling gas flows in the Y-direction. However, the interlayer cooling gas channels 121b to 125b are placed so that the cooling gas does not flow straight in the Y-direction.

The interlayer cooling gas channel 121b extends in the Y-direction through the outer partition wall 108b on the cooling gas introducing mechanism 112b side. One end of the interlayer cooling gas channel 121b is connected to the cooling gas introducing pipe 111b. The other end of the interlayer cooling gas channel 121b is connected to a space formed between the outer partition wall 108b and the outer partition wall 108a on the cooling gas introducing mechanism 112b side.

The interlayer cooling gas channel 122b extends in the Y-direction through the outer partition wall 108a on the cooling gas introducing mechanism 112b side. One end of the interlayer cooling gas channel 122b is connected to the space formed between the outer partition wall 108b and the outer partition wall 108a on the cooling gas introducing mechanism 112b side. The other end of the interlayer cooling gas channel 122b is connected to a space formed between the outer partition wall 108a and the outer partition wall heat-generating member 107 on the cooling gas introducing mechanism 112b side.

The interlayer cooling gas channels 123b extend in the Y-direction through the outer partition wall heat-generating member 107 on the cooling gas introducing mechanism 112b side. One end of each interlayer cooling gas channel 123b is connected to the space formed between the outer partition wall 108a and the outer partition wall heat-generating member 107 on the cooling gas introducing mechanism 112b side. The other end of the interlayer cooling gas channel 123b is connected to a space formed between the outer partition wall heat-generating member 107 and the inner partition wall 105 on the cooling gas introducing mechanism 112b side.

The interlayer cooling gas channel 124b extends in the Y-direction through the inner partition wall 105 on the cooling gas introducing mechanism 112b side. One end of the interlayer cooling gas channel 124b is connected to the space formed between the outer partition wall heat-generating member 107 and the inner partition wall 105 on the cooling gas introducing mechanism 112b side. The other end of the interlayer cooling gas channel 124b is connected to a space formed between the inner partition wall 105 and the inner partition wall heat-generating member 104 on the cooling gas introducing mechanism 112b side.

The interlayer cooling gas channels 125b extend in the Y-direction through the inner partition wall heat-generating member 104 on the cooling gas introducing mechanism 112b side. One end of each interlayer cooling gas channel 125b is connected to the space formed between the inner partition wall 105 and the inner partition wall heat-generating member 104 on the cooling gas introducing mechanism 112b side. The other end of the interlayer cooling gas channel 125b is connected to the burning chamber 103.

Figure 4:
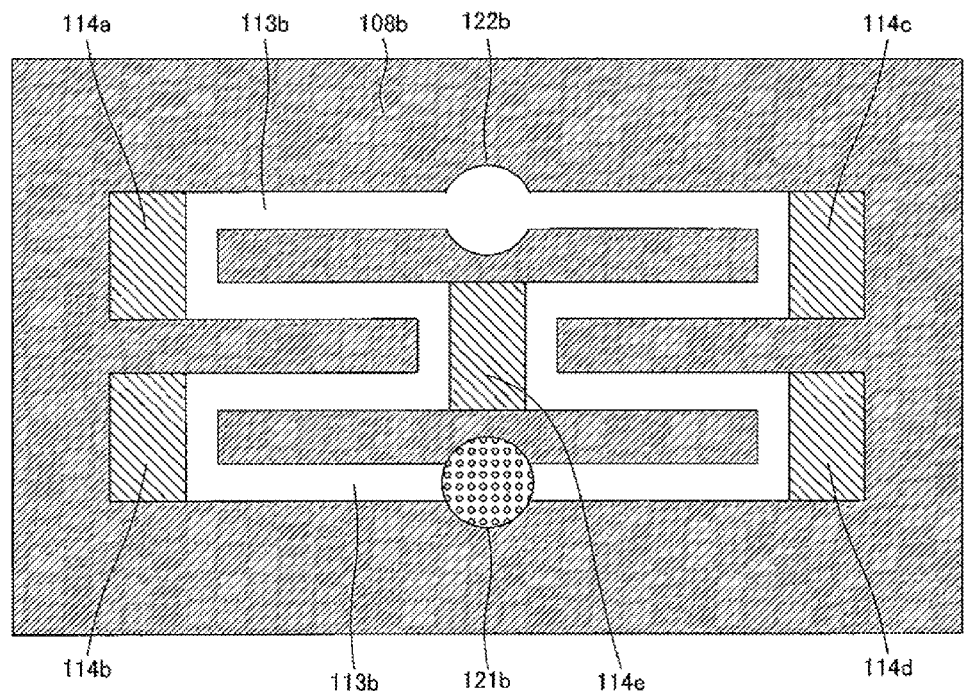
FIG. 4 is a plan view schematically showing the cooling gas channel as viewed from the direction of arrow in the section of the microwave heating apparatus according to the first embodiment cut along line A-A.

Further, as shown in FIGS. 3 and 4, heat-generating members 114a to 114e are sporadically placed in the space formed between the outer partition wall 108b and the outer partition wall 108a on the cooling gas introducing mechanism 112b side. The space and the heat-generating members 114a to 114e form channel portions through which a cooling gas flows along an X-Z plane from the interlayer cooling gas channel 121b to the interlayer cooling gas channel 122b.

FIGS. 3 and 4 show the sections of the microwave heating apparatus 101 cut along line A-A of FIGS. 1 and 2 as viewed from the direction of arrow. In FIG. 3, the interlayer cooling gas channels 121b and 122b are indicated by imaginary lines (broken lines).

The heat-generating members 114a to 114e are formed of a material which self-heats with microwaves applied thereto. For example, the heat-generating members 114a to 114e are formed of an inorganic material such as (a) a mullite-based material, (b) a silicon nitride-based material, (c) alumina, (d) a metal oxide of high microwave absorptivity (e.g., magnesia, zirconia, and iron oxide), and (e) a silicon carbide, as are the inner partition wall heat-generating member 104 and the outer partition wall heat-generating member 107. The heat-generating members 114a to 114e may be formed of the same material as or a different material from those of the inner partition wall heat-generating member 104 and the outer partition wall heat-generating member 107. However, if a material extremely different in thermal characteristics or the like is used, the temperature control in the microwave heating apparatus 101 becomes complicated. It is therefore desirable to use the same material for these members.

When the burning chamber 103 is cooled to room temperature, a cooling gas supplied from the cooling gas introducing mechanism 112b flows from the cooling gas introducing pipe 111b into the space formed between the outer partition wall 108b and the outer partition wall 108a on the cooling gas introducing mechanism 112b side through the interlayer cooling gas channel 121b. The cooling gas having flowed into the space flows out from the interlayer cooling gas channel 122b into the outer partition wall 108a in the subsequent layer. At this point, the heat-generating members 114a to 114e self-heat with the application of microwaves.

In the present embodiment, the microwave heating apparatus 101 has a two-layer structure, i.e., the outer partition walls 108a and 108b. However, the microwave heating apparatus 101 may have any number of partition walls. If the burning temperature is low and the temperature in the burning chamber 103 can reach a desired burning temperature sufficiently, the outer partition walls 108a and 108b and the outer partition wall heat-generating member 107 may not be provided. The size of the inter-partition space 106 is not limited to 50 mm. The size of the inter-partition space 106 may be changed depending on conditions including the size of the microwave heating apparatus 101 and the maximum temperature in the burning chamber 103.

In the present embodiment, two systems of the cooling gas channels 113a and 113b are provided. However, two systems are not always required. At least one system may suffice. For example, only the interior of the burning chamber 103 may be cooled or only the inter-partition space 106 may be cooled. Alternatively, one system may branch into two for cooling the burning chamber 103 and the inter-partition space 106 respectively.

<Microwave Heating Method>

Figure 5:
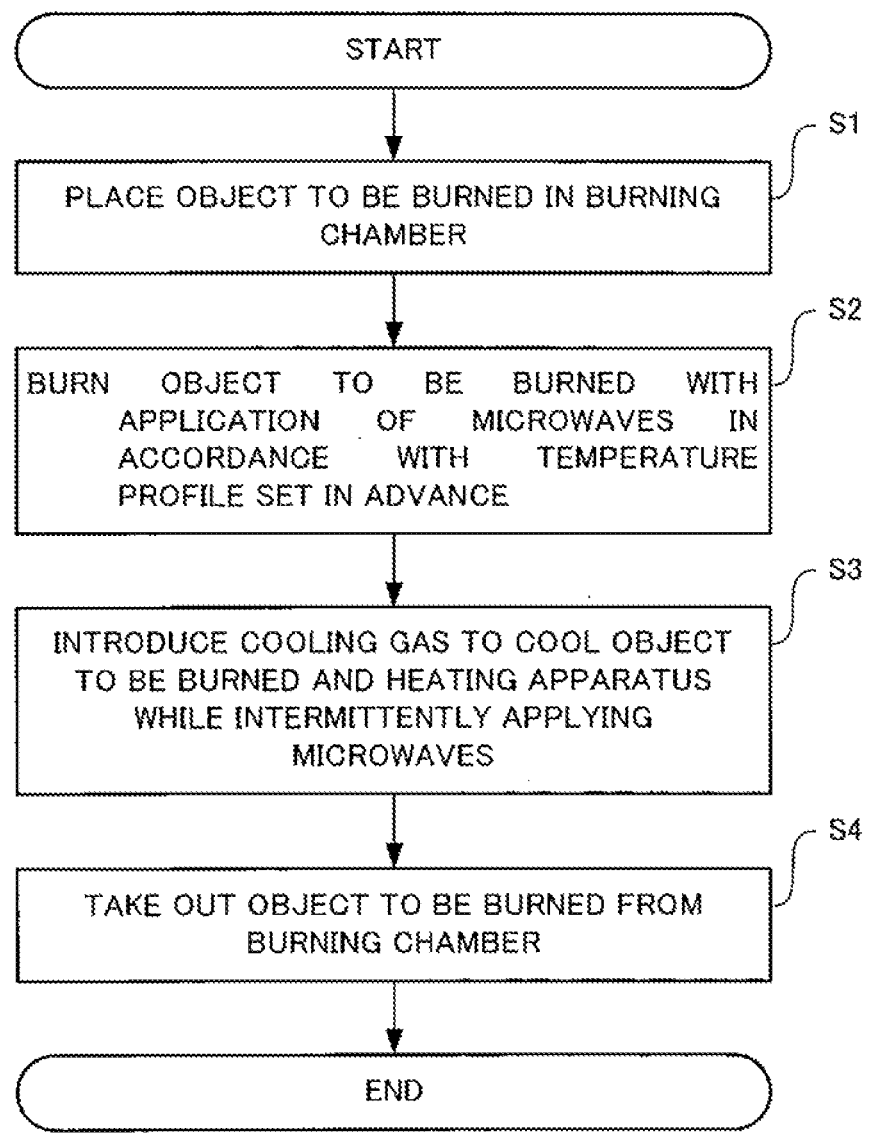
FIG. 5 is a flowchart of a microwave heating method according to the first embodiment to a fourth embodiment.

A microwave heating method using the microwave heating apparatus 101 constructed as described above will be described below. In the present embodiment, burning is performed according to the flowchart shown in FIG. 5.

Specifically, first, the object 102 to be burned is placed in the burning chamber 103 (step S1). At this point, alumina balls or the like are spread in the burning chamber 103, and the object 102 to be burned is placed thereon, thereby preventing the object 102 to be burned from being loaded when the object 102 to be burned shrinks.

Next, the object 102 to be burned is burned on the basis of a temperature profile set in advance for the object 102 to be burned (step S2). At this point, the cooling gas introducing mechanisms 112a and 112b are operated to apply certain pressures into the cooling gas channels 113a and 113b, thereby preventing high-temperature gas from the burning chamber 103 from flowing out to the outer layers through the cooling gas channels 113a and 113b. Heat from the burning chamber 103 can also be prevented from escaping.

Next, the cooling gas introducing mechanisms 112a and 112b are operated to cool the burning chamber 103 to room temperature, thereby cooling the object 102 to be burned and the interior of the microwave heating apparatus 101 (step S3). At this point, microwaves are intermittently applied to cause the heat-generating members 114a to 114e in the cooling gas channels 113a and 113b to self-heat. In the passage of a cooling gas through the cooling gas channels 113a and 113b, the cooling gas is heated to such a temperature that the materials forming the microwave heating apparatus 101 are not broken by thermal shock. With a reduction in the temperature of the burning chamber 103, the application time of microwaves is reduced, and finally the application of microwaves is stopped.

Lastly, after confirming that the temperature in the burning chamber 103 has been reduced to a temperature at which the object 102 to be burned can be taken out (temperature H shown in FIG. 6), the object 102 to be burned having been completely burned is taken out from the burning chamber 103 (step S4).

Figure 6:
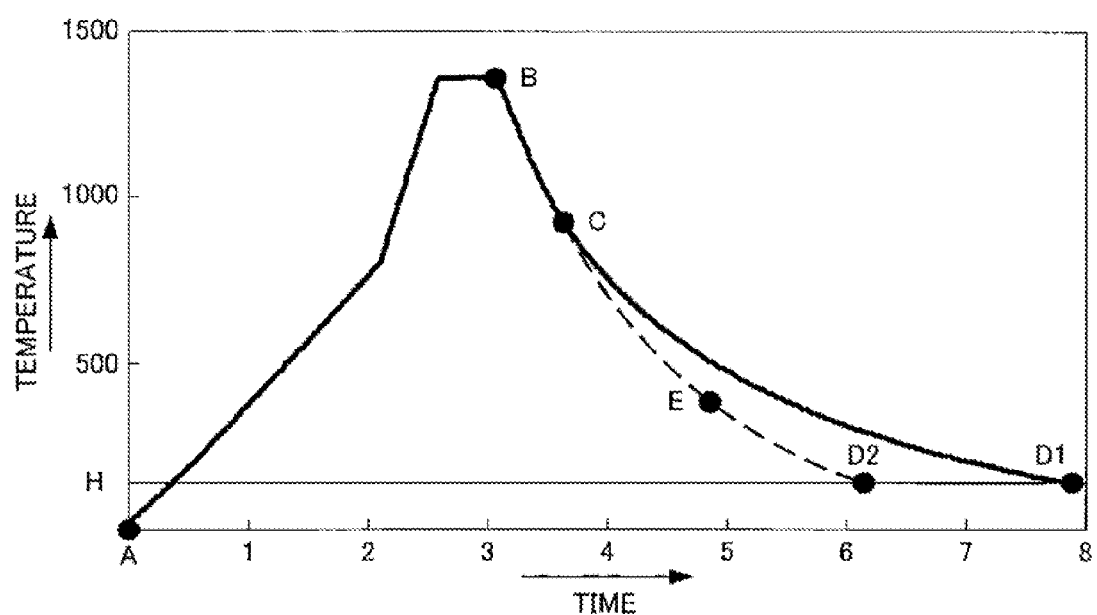
FIG. 6 is a diagram showing a temperature profile in the microwave heating method according to the first to fourth embodiments.

When the temperature in the burning chamber 103 is reduced, microwaves are intermittently applied while a cooling gas is being introduced. Thus, the temperature in the burning chamber 103 can be controlled in accordance with the desired temperature profile while cooling is rapidly performed. As shown in FIG. 6, for example, while the temperature was controlled in accordance with a temperature profile from point B to point C, microwaves were intermittently applied so that the total length of application time, each of which was 30 seconds, was equal to 8% of a time required from point B to point C. Subsequently, from point C to point D2, the proportion of the total length of application time, each of which was 7 seconds, was gradually reduced from the above-mentioned proportion 8%. From point E, the application of microwaves was stopped. Each microwave application time and the proportion of application time are not limited to the values of the present embodiment and may be changed depending on conditions including the external size of the microwave, heating apparatus 101 and the maximum temperature in the burning chamber 103.

When cooling is performed from point C, a temperature profile (solid line) connecting point C and point D1 is formed in the case of the related art. In contrast, in the present embodiment, a temperature profile (broken line) connecting point C and point D2 is formed. Consequently, the time required for cooling is reduced. Thus, it is possible to rapidly cool the object to be burned and the interior of the burning chamber while avoiding thermal shock breakage due to a rapid change in temperature. In the burning of fine ceramics with microwaves, the time required for burning with microwaves was reduced by about 20%.

Second Embodiment

A second embodiment of the present invention will be described with reference to the drawings. The same components as those in the first embodiment are indicated by the same reference numerals, and the description thereof is omitted.

<Microwave Heating Apparatus>

Figure 7:
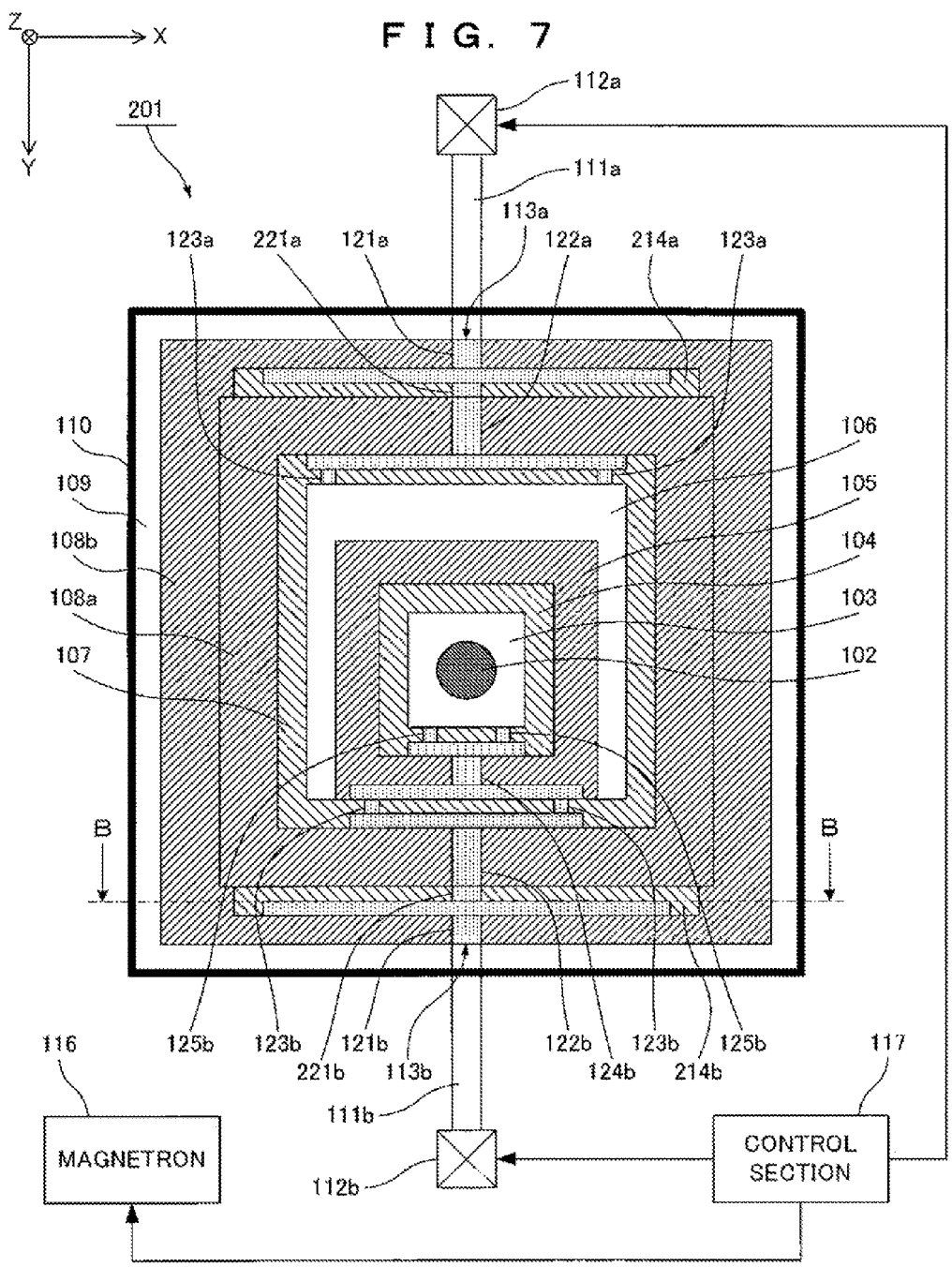
FIG. 7 is a diagram schematically showing the structure of a microwave heating apparatus according to the second embodiment as viewed from a vertical direction.
Figure 8:
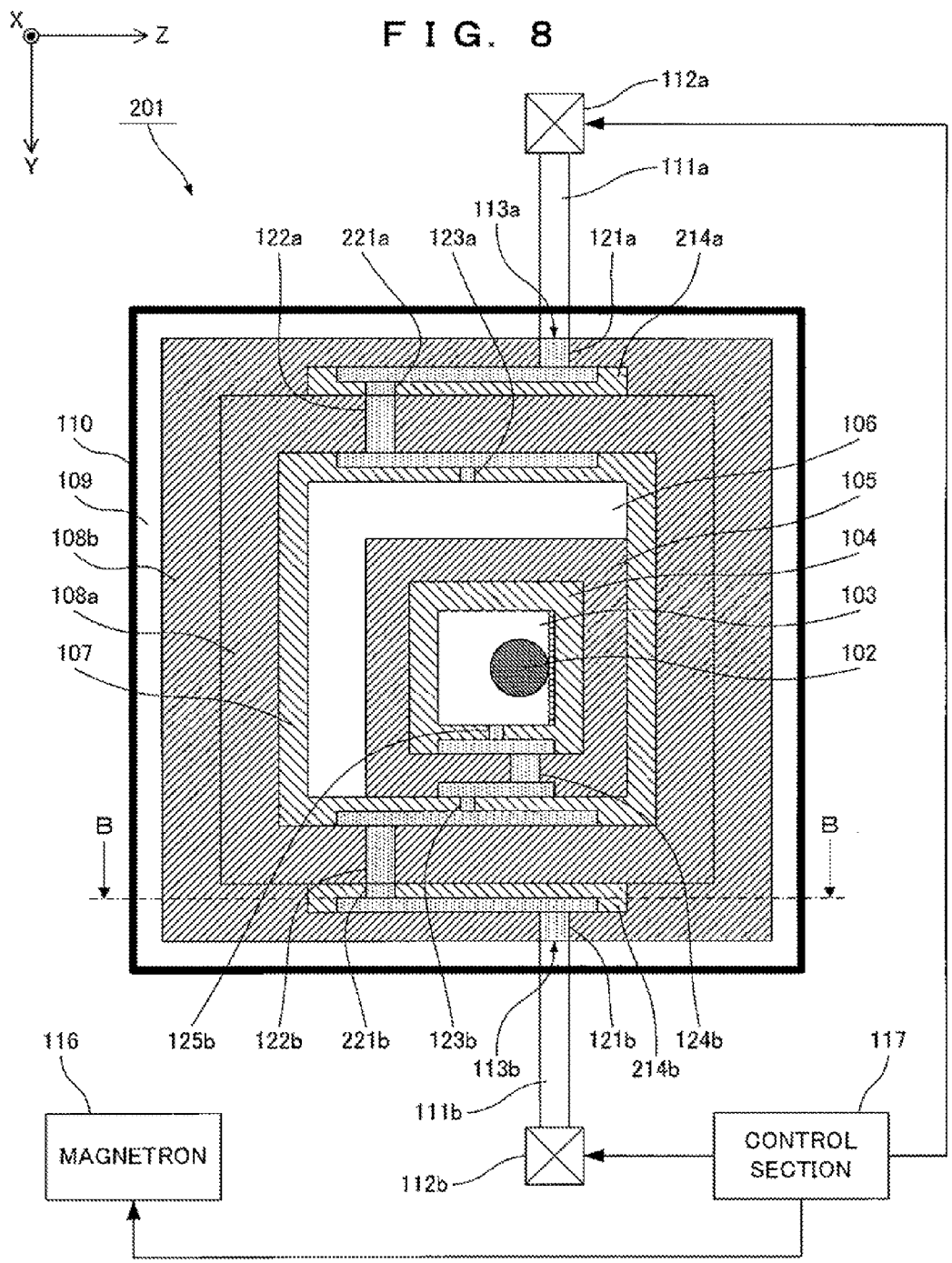
FIG. 8 is a diagram schematically showing the structure of the microwave heating apparatus according to the second embodiment as viewed from a horizontal direction.

In a microwave heating apparatus 201 of the present embodiment, as shown in FIGS. 7 and 8, a heat-generating member 214a is placed parallel to an X-Z plane in a space formed between an outer partition wall 108b and an outer partition wall 108a on side of a cooling gas introducing mechanism 112a.

In FIG. 7, the microwave heating apparatus 201 is viewed through from a Z-direction. In FIG. 8, the microwave heating apparatus 201 is viewed through from an X-direction.

Figure 9:
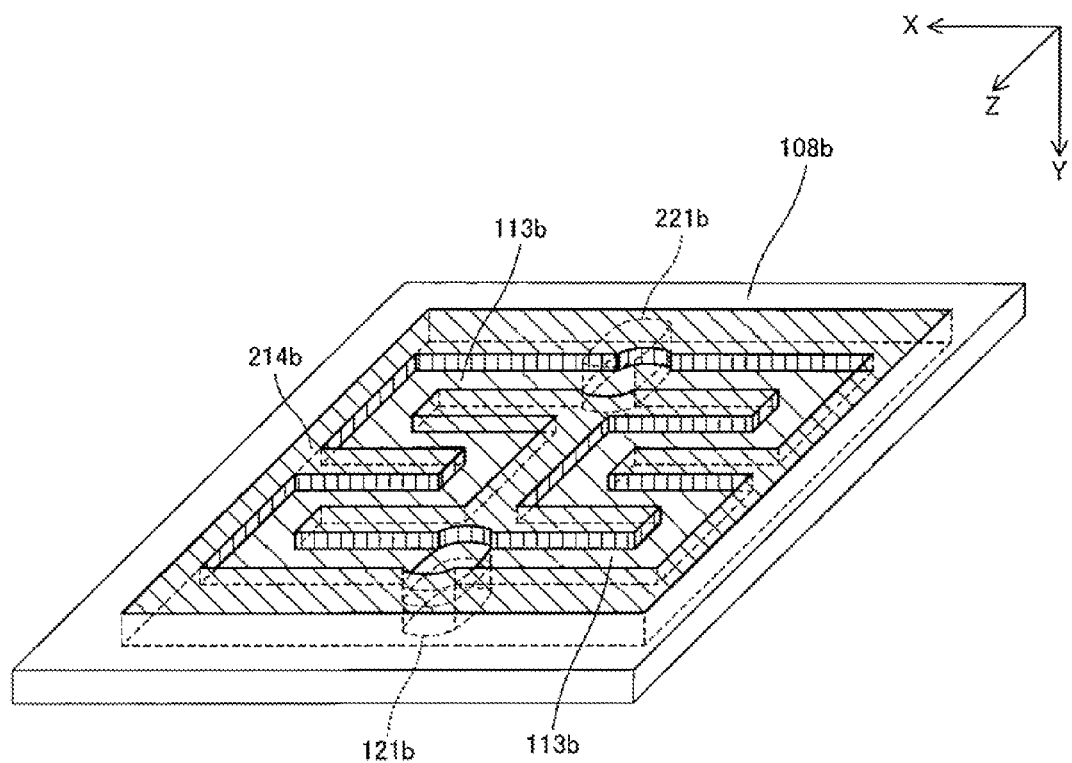
FIG. 9 is a perspective view schematically showing a cooling gas channel as viewed from the direction of arrow in a section of the microwave heating apparatus according to the second embodiment cut along line B-B.
Figure 10:
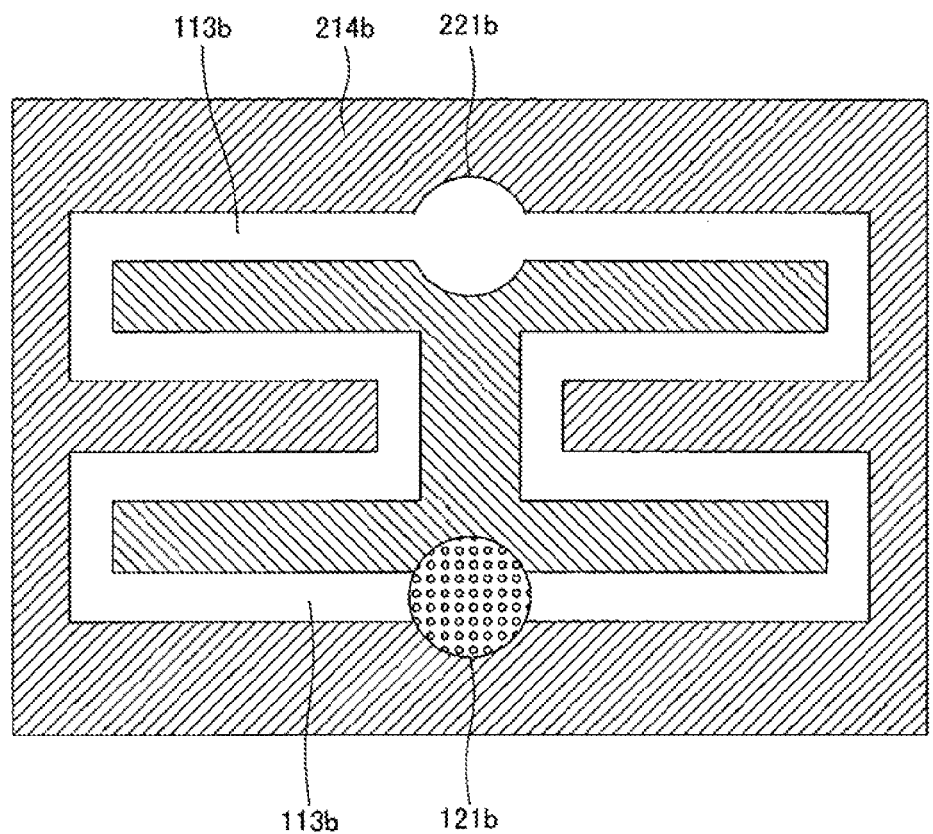
FIG. 10 is a plan view schematically showing the cooling gas channel as viewed from the direction of arrow in the section of the microwave heating apparatus according to the second embodiment cut along line B-B.

Further, as shown in FIGS. 9 and 10, a channel portion through which a cooling gas flows from an interlayer cooling gas channel 121b to an interlayer cooling gas channel 122b along the X-Z plane is formed in a heat-generating member 214b. An interlayer cooling gas channel 221a is formed in the heat-generating member 214a so that the cooling gas flows in a Y-direction.

Similarly, the heat-generating member 214b is placed in a space formed between the outer partition wall 108b and the outer partition wall 108a on the side of a cooling gas introducing mechanism 112b. A channel portion through which a cooling gas flows from an interlayer cooling gas channel 121a to an interlayer cooling gas channel 122a along the X-Z plane is formed in the heat-generating member 214a. An interlayer cooling gas channel 221b is formed in the heat-generating member 214b so that the cooling gas flows in the Y-direction.

FIGS. 9 and 10 show the sections of the microwave heating apparatus 201 cut along line B-B of FIGS. 7 and 8 as viewed from the direction of arrow. In FIG. 9, the interlayer cooling gas channel 221b is indicated by an imaginary line (broken line).

The interlayer cooling gas channel 221a extends in the Y-direction through the heat-generating member 214a. One end of the interlayer cooling gas channel 221a is connected to a space formed between the outer partition wall 108b and the heat-generating member 214a. The other end of the interlayer cooling gas channels 221a is connected to the interlayer cooling gas channel 122a.

The interlayer cooling gas channel 221b extends in the Y-direction through the heat-generating member 214b. One end of the interlayer cooling gas channel 221b is connected to a space formed between the outer partition wall 108b and the heat-generating member 214b. The other end of the interlayer cooling gas channel 221b is connected to the interlayer cooling gas channel 122b.

The heat-generating members 214a and 214b are formed of a material which self-heats with microwaves applied thereto. For example, the heat-generating members 214a and 214b are formed of an inorganic material such as (a) a mullite-based material, (b) a silicon nitride-based material, (c) alumina, (d) a metal oxide of high microwave absorptivity (e.g., magnesia, zirconia, and iron oxide), and (e) silicon carbide, as are an inner partition wall heat-generating member 104 and an outer partition wall heat-generating member 107. The heat-generating members 214a and 214b may be formed of the same material as or a different material from those of the inner partition wall heat-generating member 104 and the outer partition wall heat-generating member 107. However, if a material extremely different in thermal characteristics is used, the temperature control in a burning chamber 103 becomes complicated. It is therefore desirable to use the same material for these members.

When the burning chamber 103 is cooled to room temperature, a cooling gas supplied from the cooling gas introducing mechanism 112b flows from a cooling gas introducing pipe 111b into the space formed between the outer partition wall 108b and the heat-generating member 214b through the interlayer cooling gas channel 121b. The cooling gas having flowed into the space flows out from the interlayer cooling gas channel 122b into the outer partition wall 108a in the subsequent layer. At this point, the heat-generating member 214b self-heats with the application of microwaves.

<Microwave Heating Method>

A microwave heating method using the microwave heating apparatus 201 constructed as described above will be described below. In the present embodiment, burning is performed according to the flowchart of FIG. 5, as in the first embodiment. However, the method in the present embodiment differs from that in the first embodiment in the step (step S3) of cooling an object 102 to be burned and the interior of the microwave heating apparatus 201 by operating the cooling gas introducing mechanisms 112a and 112b.

Specifically, microwaves are intermittently applied to cause the inner partition wall heat-generating member 104, the outer partition wall heat-generating member 107 and the cooling gas heating members 214a and 214b to self-heat. In the passage of a cooling gas through cooling gas channels 113a and 113b, the cooling gas is heated to a temperature at which the materials forming the microwave heating apparatus 201 are not broken by a thermal shock. With a reduction in the temperature of the burning chamber 103, the application time of microwaves is reduced, and finally the application of microwaves is stopped.

When the temperature in the burning chamber 103 is reduced, microwaves are intermittently applied while a cooling gas is being introduced, as in the first embodiment. Thus, the temperature in the burning chamber 103 can be controlled in accordance with a desired temperature profile while cooling is rapidly performed. As shown in FIG. 6, for example, while the temperature was controlled in accordance with a temperature profile from point B to point C, microwaves were intermittently applied so that the total length of application time, each of which was 30 seconds, was equal to 8% of a required time from point B to point C. Subsequently, from point C to point D2, the proportion of the total length of application time, each of which was 7 seconds, was gradually reduced from the above-mentioned proportion 8%. From point E, the application of microwaves was stopped. Each application time and the proportion of application time are not limited to the values of the present embodiment and may be changed depending on conditions including the external size of the microwave heating apparatus 201 and the maximum temperature in the burning chamber 103.

When cooling is performed from point C, a temperature profile (solid line) connecting point C and point D1 is formed in the case of the related art. In contrast, in the present embodiment, a temperature profile (broken line) connecting point C and point D2 is formed. Consequently, the time required for cooling is reduced. Thus, it is possible to rapidly cool the object to be burned and the interior of the burning chamber while avoiding thermal shock breakage due to a rapid change in temperature. In the burning of fine ceramics with microwaves, the time required for burning with microwaves was reduced by about 20%, as in the first embodiment.

Third Embodiment

A third embodiment of the present invention will be described with reference to the drawings. The same components as those in the first embodiment are indicated by the same reference numerals, and the description thereof is omitted.

<Microwave Heating Apparatus>

Figure 11:
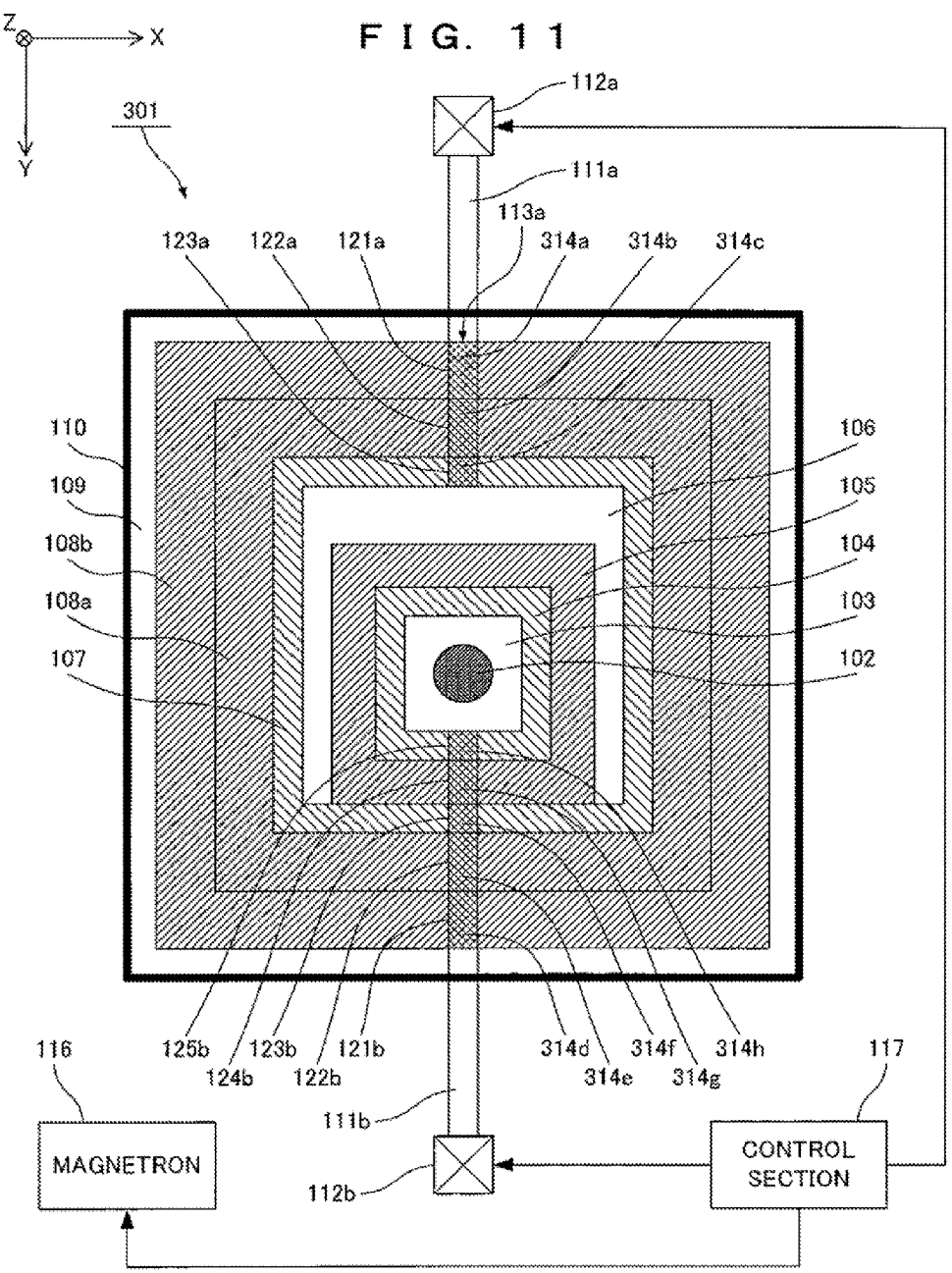
FIG. 11 is a diagram schematically showing the structure of a microwave heating apparatus according to a third embodiment as viewed from a vertical direction.
Figure 12:
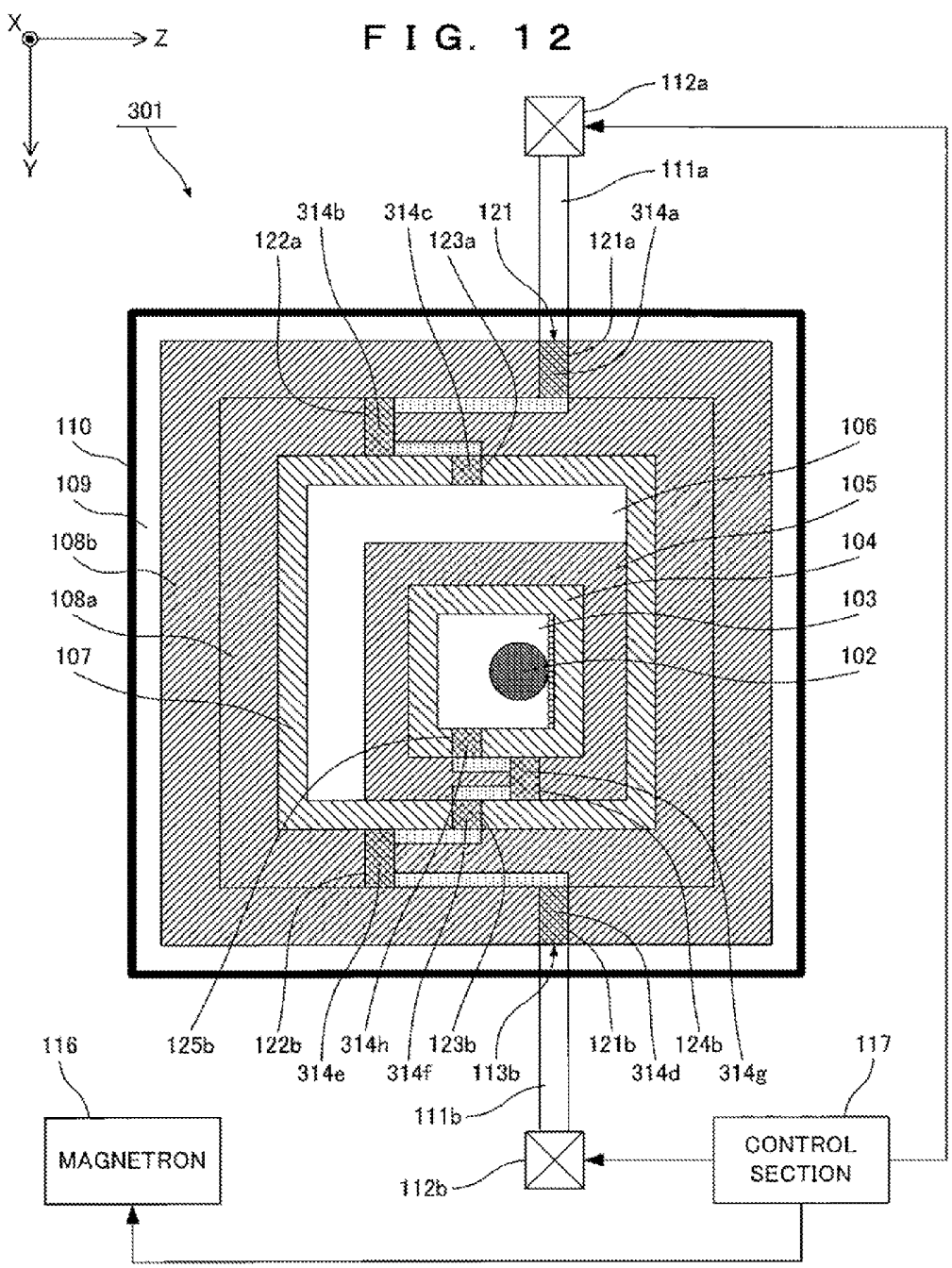
FIG. 12 is a diagram schematically showing the structure of the microwave heating apparatus according to the third embodiment as viewed from a horizontal direction.

In a microwave heating apparatus 301 of the present embodiment, as shown in FIGS. 11 and 12, a heat-generating member 314a is placed in an interlayer cooling gas channel 121a. A heat-generating member 314b is placed in an interlayer cooling gas channel 122a. A heat-generating member 314c is placed in an interlayer cooling gas channel 123a. A heat-generating member 314d is placed in an interlayer cooling gas channel 121b. A heat-generating member 314e is placed in an interlayer cooling gas channel 122b. A heat-generating member 314f is placed in an interlayer cooling gas channel 123b. A heat-generating member 314g is placed in an interlayer cooling gas channel 124b. A heat-generating member 314h is placed in an interlayer cooling gas channel 125b.

In FIG. 11, the microwave heating apparatus 301 is viewed through from a Z-direction. In FIG. 12, the microwave heating apparatus 301 is viewed through from an X-direction.

The heat-generating members 314a to 314h are formed of a material which self-heats with microwaves applied thereto. For example, the heat-generating members 314a to 314h are formed of an inorganic material such as (a) a mullite-based material, (b) a silicon nitride-based material, (c) alumina, and (d) a metal oxide of high microwave absorptivity (e.g., magnesia, zirconia, and iron oxide), as are an inner partition wall heat-generating member 104 and an outer partition wall heat-generating member 107. The heat-generating members 314a to 314h may be formed of the same material as or a different material from those of the inner partition wall heat-generating member 104 and the outer partition wall heat-generating member 107. However, if a material extremely different in thermal characteristics or the like is used, the temperature control in a burning chamber 103 becomes complicated. It is therefore desirable to use the same material for these members.

Figure 13:
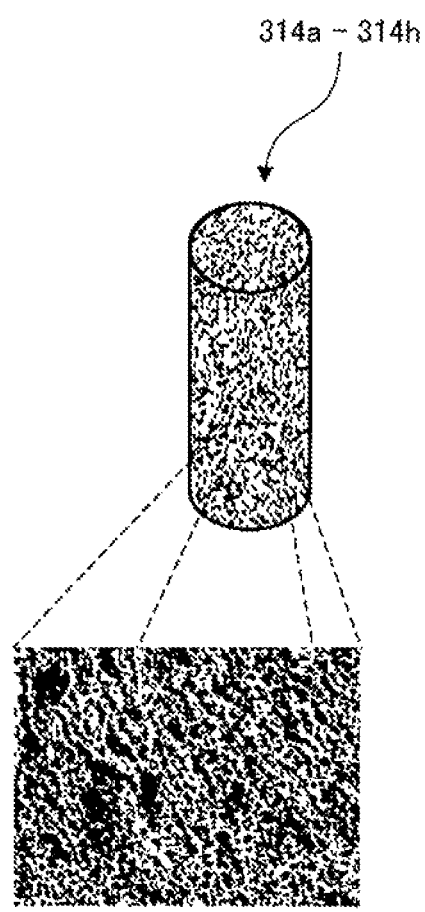
FIG. 13 is a diagram schematically showing a heat-generating member used in the microwave heating apparatus according to the third embodiment.

Further, as shown in FIG. 13, the heat-generating members 314a to 314h have a sponge-like structure and have pores through which a cooling gas can pass. For example, each of the heat-generating members 314a to 314h is a cylindrical porous member which has an average pore diameter of 30 μm and a pore ratio of about 70%, is formed of silicon carbide, and has a diameter of 40 mm. The pore size and the pore ratio of the heat-generating members 314a to 314h are not limited to these values. The pore diameter and the pore ratio may be changed as appropriate according to a required cooling gas flow rate, a required cooling gas temperature, and a pressure loss due to the heat-generating members 314a to 314h.

When the burning chamber 103 is cooled to room temperature, a cooling gas supplied from a cooling gas introducing mechanism 112b flows from a cooling gas introducing pipe 111b into a space formed between an outer partition wall 108b and an outer partition wall 108a on the cooling gas introducing mechanism 112b side through the interlayer cooling gas channel 121b. The cooling gas having flowed into the space flows out from the interlayer cooling gas channel 122b into the outer partition wall 108a in the subsequent layer. At this point, the heat-generating member 314c self-heats with the application of microwaves.

In the present embodiment, each of the heat-generating members 314a to 314h is formed of one component. However, each of the heat-generating members 314a to 314h may be formed of a plurality of components and the plurality of components may be formed of heat-generating members having different microwave absorptivity.

<Microwave Heating Method>

A microwave heating method, using the microwave heating apparatus 301 constructed as described above will be described below. In the present embodiment, burning is performed according to the flowchart of FIG. 5, as in the first embodiment. However, the method in the present embodiment differs from that in the first embodiment in the step (step S3) of cooling an object 102 to be burned and the interior of the microwave heating apparatus 301 by operating a cooling gas introducing mechanism 112a and the cooling gas introducing mechanism 112b.

Specifically, microwaves are intermittently applied to cause the inner partition wall heat-generating member 104, the outer partition wall heat-generating member 107 and the heat-generating members 314a to 314h to self-heat. In the passage of a cooling gas through cooling gas channels 113a and 113b, the cooling gas is heated to a temperature at which the materials forming the microwave heating apparatus 301 are not broken by a thermal shock. With a reduction in the temperature of the burning chamber 103, the application time of microwaves is reduced, and finally the application of microwaves is stopped.

When the temperature in the burning chamber 103 is reduced, microwaves are intermittently applied while a cooling gas is being introduced, as in the first embodiment. Thus, the temperature in the burning chamber 103 can be controlled in accordance with a desired temperature profile while cooling is rapidly performed. As shown in FIG. 6, for example, while the temperature was controlled in accordance with a temperature profile from point B to point C, microwaves were intermittently applied so that the total length of application time, each of which was 30 seconds, was equal to 8 of a required time from point B to point C. Subsequently, from point C to point D2, the proportion of the total length of application time, each of which was 7 seconds, was gradually reduced from the above-mentioned proportion 8%. From point E, the application of microwaves was stopped. Each application time and the proportion of application time are not limited to the values of the present embodiment and may be changed depending on conditions including the external size of the microwave heating apparatus 301 and the maximum temperature in the burning chamber 103.

When cooling is performed from point C, a temperature profile (solid line) connecting point C and point D1 is formed in the case of the related art. In contrast, in the present embodiment, a temperature profile (broken line) connecting point C and point D2 is formed. Consequently, the time required for cooling is reduced. Thus, it is possible to rapidly cool the object to be burned and the interior of the burning chamber while avoiding thermal shock breakage due to a rapid change in temperature. In the burning of fine ceramics with microwaves, the time required for burning with microwaves was reduced by about 20%, as in the first embodiment.

Fourth Embodiment

A fourth embodiment of the present invention will be described with reference to the drawings. The same components as those in the first embodiment are indicated by the same reference numerals, and the description thereof is omitted.

<Microwave Heating Apparatus>

Figure 14:
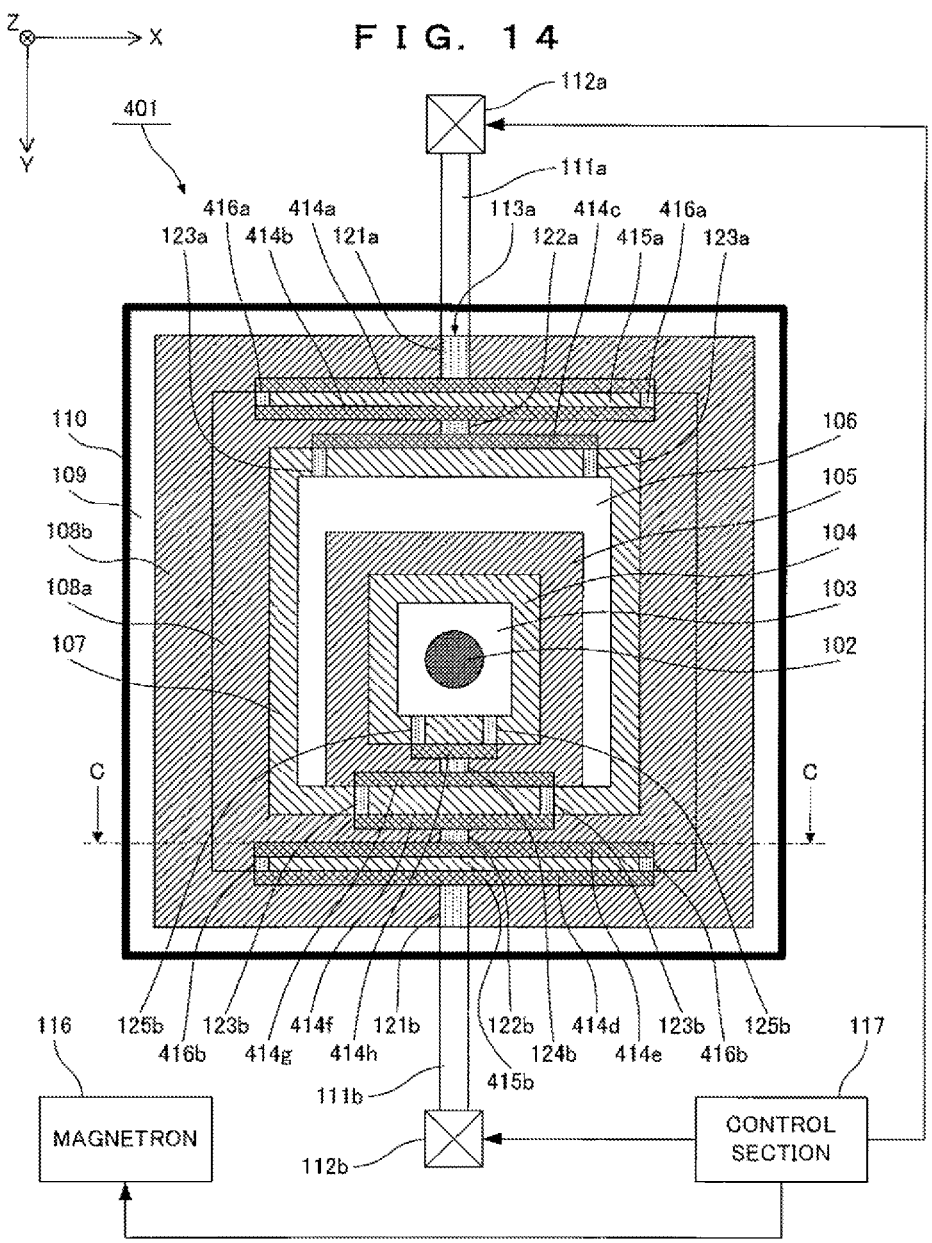
FIG. 14 is a diagram schematically showing the structure of a microwave heating apparatus according to a fourth embodiment as viewed from a vertical direction.
Figure 15:
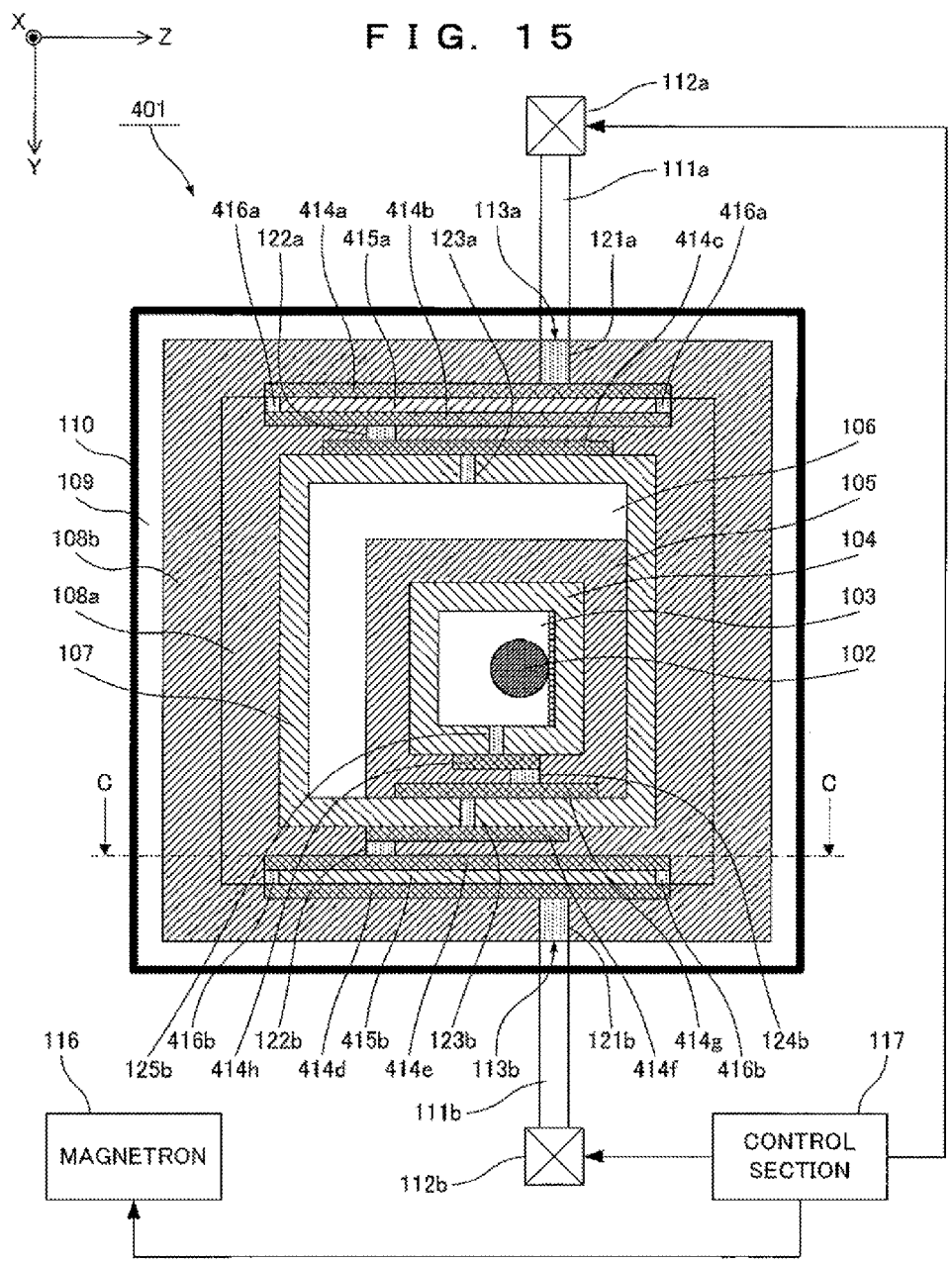
FIG. 15 is a diagram schematically showing the structure of the microwave heating apparatus according to the fourth embodiment as viewed from a horizontal direction.

In a microwave heating apparatus 401 of the present embodiment, as shown in FIGS. 14 and 15, heat-generating members 414a and 414b and a channel-forming heat-generating member 415a are placed parallel to an X-Z plane in a space formed between an outer partition wall 108b and an outer partition wall 108a on the side of a cooling gas introducing mechanism 112a. A heat-generating member 414c is placed parallel to the X-Z plane in a space formed between the outer partition wall 108a and an outer partition wall heat-generating member 107 on the cooling gas introducing mechanism 112a side.

In FIG. 14, the microwave heating apparatus 401 is viewed through from a Z-direction. In FIG. 15, the microwave heating apparatus 401 is viewed through from an X-direction.

Further, heat-generating members 414d and 414e and a channel-forming heat-generating member 415b are placed parallel to the X-Z plane in a space formed between the outer partition wall 108b and the outer partition wall 108a on the side of a cooling gas introducing mechanism 112b. A heat-generating member 414f is placed parallel to the X-Z plane in a space formed between the outer partition wall 108a and the outer partition wall heat-generating member 107 on the cooling gas introducing mechanism 112b side. A heat-generating member 414g is placed parallel to the X-Z plane in a space formed between the outer partition wall heat-generating member 107 and an inner partition wall 105 on the cooling gas introducing mechanism 112b side. A heat-generating member 414h is placed parallel to the X-Z plane in a space formed between the inner partition wall 105 and an inner partition wall heat-generating member 104 on the cooling gas introducing mechanism 112b side.

Further, as shown in FIG. 16, the channel-forming heat-generating member 415b is placed between the heat-generating member 414d and the heat-generating member 414e, thereby preventing a cooling gas introduced from a cooling gas introducing pipe 111b from flowing out from an interlayer cooling gas channel 121b to an interlayer cooling gas channel 122b in a short-cut manner.

Similarly, the channel-forming heat-generating member 415a is placed between the heat-generating member 414a and the heat-generating member 414b, thereby preventing a cooling gas introduced from a cooling gas introducing pipe 111a from flowing out from an interlayer cooling gas channel 121a to an interlayer cooling gas channel 122a in a short-cut manner.

FIG. 16 shows a section of the microwave heating apparatus 401 cut along line C-C of FIGS. 14 and 15 as viewed from the direction of arrow. In FIG. 16, the outer partition walls 108a and 108b are partially cutaway. Further, in FIG. 16, the interlayer cooling gas channels 121b and 122b are indicated by imaginary lines (broken lines).

The heat-generating members 414a to 414h and the channel-forming heat-generating members 415a and 415b are formed of a material which self-heats with microwaves applied thereto. For example, the heat-generating members 414a to 414h and the channel-forming heat-generating members 415a and 415b are formed of an inorganic material such as (a) a mullite-based material, (b) a silicon nitride-based material, (c) alumina, and (d) a metal oxide of high microwave absorptivity (e.g., magnesia, zirconia, and iron oxide), as are the inner partition wall heat-generating member 104 and the outer partition wall heat-generating member 107. The heat-generating members 414a to 414h and the channel-forming heat-generating members 415a and 415b may be formed of the same material as or a different material from those of the inner partition wall heat-generating member 104 and the outer partition wall heat-generating member 107. However, if a material extremely different in thermal characteristics or the like is used, the temperature control in a burning chamber 103 becomes complicated. It is therefore desirable to use the same material for these members.

Figure 17:
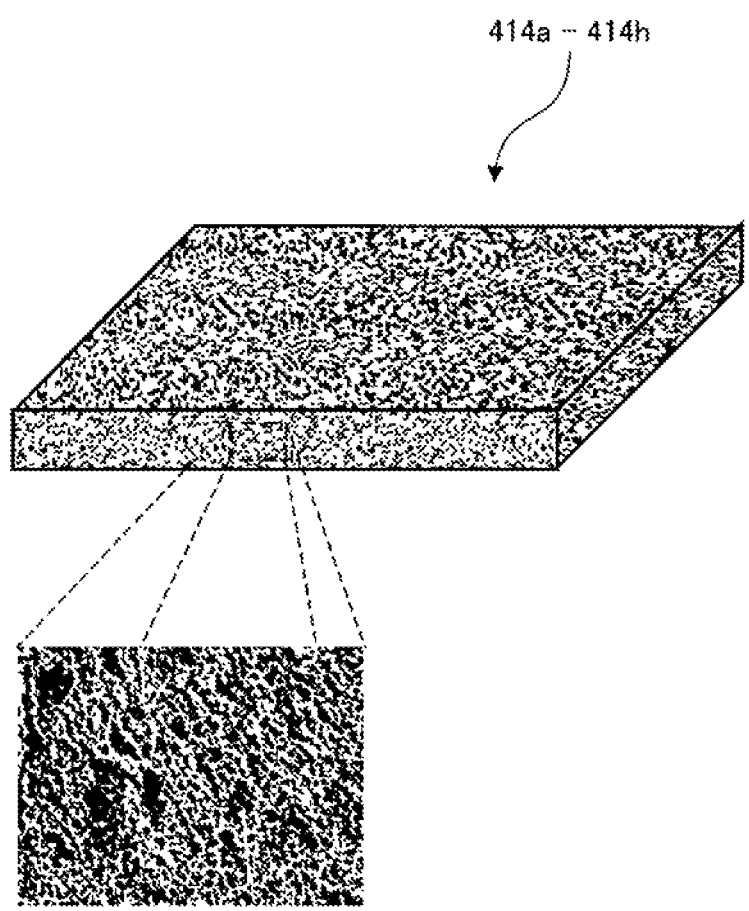
FIG. 17 is a diagram schematically showing a heat-generating member used in the microwave heating apparatus according to the fourth embodiment.

Further, as shown in FIG. 17, the heat-generating members 414a to 414h have a sponge-like structure and have pores through which a cooling gas can pass. For example, each of the heat-generating members 414a to 414h is a plate-like porous member which has an average pore diameter of 50 μm and a pore ratio of about 75%, is formed of silicon carbide, and has a thickness of 8 mm. The pore diameter and the pore ratio of the heat-generating members 414a to 414h are not limited. The pore diameter and the pore ratio may be changed as appropriate according to a required cooling gas flow rate, a required cooling gas temperature, and a pressure loss due to the heat-generating members 414a to 414h.

Further, the size of the channel-forming heat-generating member 415b along the X-Z plane is slightly smaller than that of the heat-generating members 414d and 414e. Accordingly, an inter-heat-generating-member cooling gas channel 416b surrounded by the heat-generating members 414d and 414e, the outer partition walls 108a and 108b and the channel-forming heat-generating member 415b, is formed on the periphery of the channel-forming heat-generating member 415b, with the channel-forming heat-generating member 415b placed between the heat-generating members 414d and 414e. Similarly, an inter-heat-generating-member cooling gas channel 416a is formed on the periphery of the channel-forming heat-generating member 415a.

When the burning chamber 103 is cooled to room temperature, a cooling gas supplied from the cooling gas introducing mechanism 112b flows from the cooling gas introducing pipe 111b through the interlayer cooling gas channel 121b and passes through the heat-generating member 414d placed on the outer partition wall 108b side. The cooling gas having passed through the heat-generating member 414d flows through the inter-heat-generating-member cooling gas channel 416b and passes through the heat-generating member 414e placed on the outer partition wall 108a side. The cooling gas having passed through the heat-generating member 414e flows out from the interlayer cooling gas channel 122b into the outer partition wall 108a in the subsequent layer. At this point, the heat-generating members 414d and 414e and the channel-forming heat-generating member 415b self-heat with the application of microwaves.

In the present embodiment, a cooling gas is prevented from flowing out in a short-cut manner by the channel-forming heat-generating members 415a and 415b. In a configuration in which a cooling gas can be prevented from flowing out in a short-cut manner, however, the channel-forming heat-generating members 415a and 415b may be formed of a heat-insulating material permitting the transmission of microwaves, as are the outer partition walls 108a and 108b.

<Microwave Heating Method>

A microwave heating method using the microwave heating apparatus 401 constructed as described above will be described below. In the present embodiment, burning is performed according to the flowchart of FIG. 5, as in the first embodiment. However, the method in the present embodiment differs from that in the first embodiment in the step (step S3) of cooling an object 102 to be burned and the interior of the microwave heating apparatus 401 by operating the cooling gas introducing mechanisms 112a and 112b.

Specifically, microwaves are intermittently applied to cause the inner partition wall heat-generating member 104, the outer partition wall heat-generating member 107, the heat-generating members 414a to 414h and the channel-forming heat-generating members 415a and 415b to self-heat. In the passage of a cooling gas through cooling gas channels 113a and 113b, the cooling gas is heated to a temperature at which the materials forming the microwave heating apparatus 401 are not broken by a thermal shock. With a reduction in the temperature of the burning chamber 103, the application time of microwaves is reduced, and finally the application of microwaves is stopped.

When the temperature in the burning chamber 103 is reduced, microwaves are intermittently applied while a cooling gas is being introduced, as in the first embodiment. Thus, the temperature in the burning chamber 103 can be controlled in accordance with a desired temperature profile while cooling is rapidly performed. As shown in FIG. 6, for example, while the temperature was controlled in accordance with a temperature profile from point B to point C, microwaves were intermittently applied so that the total length of application time, each of which was 30 seconds, was equal to 8% of a required time from point B to point C. Subsequently, from point C to point D2, the proportion of the total length of application time, each of which was 7 seconds, was gradually reduced from the above-mentioned proportion 8%. From point E, the application of microwaves was stopped. Each application time and the proportion of application time are not limited to the values of the present embodiment and may be changed depending on conditions including the external size of the microwave heating apparatus 401 and the maximum temperature in the burning chamber 103.

When cooling is performed from point C, a temperature profile (solid line) connecting point C and point D1 is formed in the case of the related art. In contrast, in the present embodiment, a temperature profile (broken line) connecting point C and point D2 is formed. Consequently, the time required for cooling is reduced. Thus, it is possible to rapidly cool the object to be burned and the interior of the burning chamber while avoiding thermal shock breakage due to a rapid change in temperature. In the burning of fine ceramics with microwaves, the time required for burning with microwaves was reduced by about 20%, as in the first embodiment.

INDUSTRIAL APPLICABILITY

The present invention can be used as a microwave heating method and a microwave heating apparatus for producing a burned object by burning an object to be burned which is formed of a fine ceramic material or the like with the application of microwaves, particularly as a microwave heating method and a microwave heating apparatus which can be applied for burning other non-ceramic materials to be burned with microwaves.

The invention claimed is:

1. A microwave heating apparatus for burning an object to be burned by using microwaves, comprising:
    a burning chamber in which the object to be burned is placed;
    a housing defining a cavity that accommodates the burning chamber;
    a magnetron for applying microwaves into the heating apparatus;
    an introduction mechanism for introducing a cooling gas from outside the heating apparatus into the heating apparatus;
    a channel through which the cooling gas flows from the introduction mechanism to the burning chamber;
    a heat-generating member for self-heating with microwaves applied thereto to heat the cooling gas flowing through the channel; and
    a control section for, when the burning chamber having the object to be burned placed therein is to be cooled, causing the introduction mechanism to introduce the cooling gas into the heating apparatus, and causing the magnetron to intermittently apply microwaves into the heating apparatus, wherein
    the channel comprises a parallel portion arranged in a first direction linking the introduction mechanism to the burning chamber and a perpendicular portion that is perpendicular to the first direction, the parallel and perpendicular portions being arranged in the cavity;
    a first partition wall having the burning chamber placed therein and a second partition wall covered with the first partition wall,
    wherein a part of the channel is formed between the first partition wall and the second partition wall; and
    wherein the channel has a first channel portion extending through the first partition wall, a second channel portion extending through the second partition wall, and a third channel portion formed between the first partition wall and the second partition wall so that the cooling gas flows from the first channel portion into the second channel portion,
    the first channel portion and the second channel portion are parallel to the first direction, and
    the third channel portion is perpendicular to the first direction.

2. The microwave heating apparatus according to claim 1, wherein a plurality of heat-generating members sporadically provided in the third channel portion are placed between the first partition wall and the second partition wall.

3. The microwave heating apparatus according to claim 1, wherein the heat-generating member forming a part of the third channel portion is placed between the first partition wall and the second partition wall.

4. The microwave heating apparatus according to claim 1, wherein the heat-generating member through which the cooling gas can pass is placed in at least one of the first channel portion and the second channel portion.

5. The microwave heating apparatus according to claim 4, wherein pores having an average pore diameter of 30 μm and a pore ratio of 70% are formed in the heat-generating member.

6. The microwave heating apparatus according to claim 1, wherein the heat-generating member through which the cooling gas can pass is placed in the third channel portion.

7. The microwave heating apparatus according to claim 6, wherein pores having an average pore diameter of 50 μm and a pore ratio of 75% are formed in the heat-generating member.

* * * * *